Feb. 6, 1923.
A. W. CHAPMAN ET AL
MOVABLE SEAT FOR VEHICLES
Filed Aug. 7, 1922
1,444,660
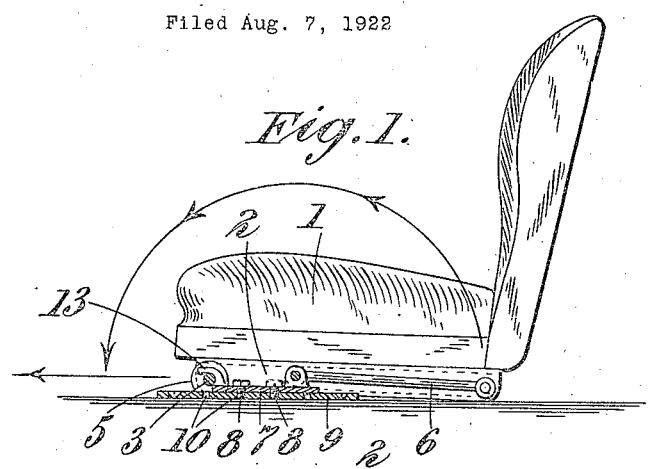
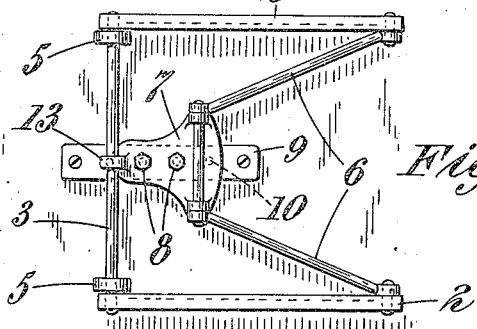
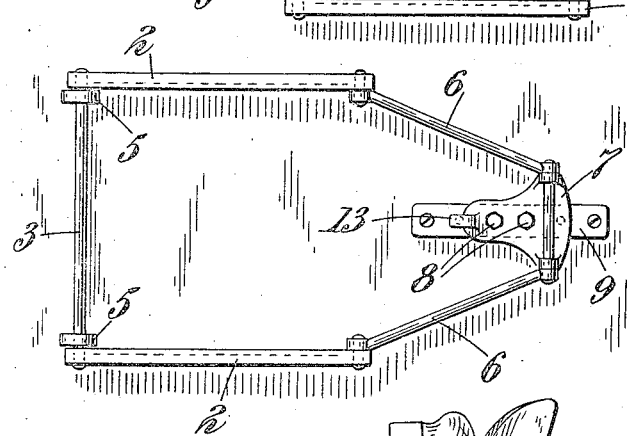
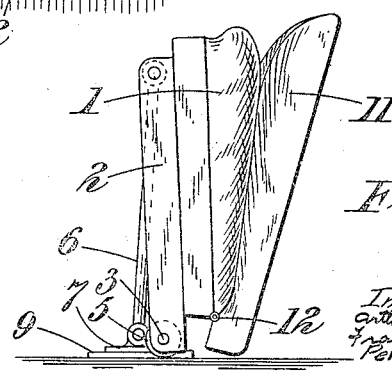

Patented Feb. 6, 1923.

1,444,660

UNITED STATES PATENT OFFICE.

ARTHUR WILLIAM CHAPMAN AND FRANK GUY LANG BIDDLECOMBE, OF LONDON, ENGLAND.

MOVABLE SEAT FOR VEHICLES.

Application filed August 7, 1922. Serial No. 580,295.

*To all whom it may concern:*

Be it known that we, ARTHUR WILLIAM CHAPMAN and FRANK GUY LANG BIDDLE-COMBE, subjects of the King of Great Britain, both of Ranelagh Gardens, Hurlingham, London, S. W. 6, England, have invented a Movable Seat for Vehicles and the like, of which the following is a specification.

This invention relates to movable seats for motor-cars, boats, aeroplanes, or other conveyances, or in schools or like institutions, particularly applicable where it is convenient or necessary to move a seat which would otherwise obstruct a person entering or leaving the vehicle or in small spaces. Such conditions are well-known in connection with enclosed-drive motor-cars, etc.

It has been proposed to mount the seat slidably on a track, to hinge it, and to mount it on a form of parallel-ruler movement, but these devices have objections when put into practice, often being clumsy in operation and sticking or binding if dirt or grit is present.

According to our present invention, we provide the seat or the frame of it with a wheel or wheels, slides or rollers, or other suitable anti-friction devices such as castors or runners adapted to run in or on a track or not, as desired, the seat being so contrived as to be pivotal about a point which may be a hinge in the case of slides, or the axle in the case of wheels or rollers, the chief requirement being that the seat may partially tip up about a point near either back or front extremities. The alternative extremity is provided with a hinged or pivoted arm, or arms, which are of suitable length or may be made up of a series of articulated rods with knuckle joints the other ends of such arms or series being hinged or pivoted to the floor of the vehicle. When the seat is moved backwards or forwards, it performs a movement like the connecting rod of a steam engine, the locus of a point near one end being a straight line, that of a point near the other end being an arc of a circle by reason of the arms or series working like a crank.

The arms may be suitably bent so that the seat is tilted when in one limiting position, to leave more room, but is in correct position at the other limit. A catch is also provided to prevent the seat tipping over backwards when in use, a suitable form being a simple angle piece engaging the axle of the wheels (where wheels are provided). The positions of the wheels and arms may of course be interchanged if desired.

The whole seat may be tilted over backwards to facilitate repairs, cleaning etc., about one end of the arms as a centre. Means may also be provided for locking it in any convenient position, a range of adjustability thus being provided. If desired, a folding back may be used to enable the seat to be folded up against, for example, the back of another, or a wall. The actual seat may be rotatable on a framework mounted according to the invention.

The fastening of the rods to the floor may be adjustable, and may comprise a bracket with bolts fitting into a chosen position in a series of holes in a metal strip secured to the floor.

The seat may be so constructed and the weight so disposed that only a light push is required to move it.

The invention is illustrated in a very simple form, Fig. 1 showing the seat on a frame constructed in accordance with the invention, in its normal position. Fig. 2 is a plan of the seat frame as shown in Fig. 1. Fig. 3 is a similar view in the alternative position. Fig. 4 shows a seat folded up.

The upholstered body 1 of the seat is rigidly attached to the frame which comprises parallel members 2, secured as by bolting, to the body 1. The frame members 2 have connected with them near their front ends, the axle 3 which bears small wheels or rollers 5. Pivoted to them at their rear ends are the arms 6 which form rigid links to the floor. The arms 6 are pivoted at their other ends to a plate 7. The plate 7 is secured by a bolt or bolts 8 to a plate 9 which is fixed to the floor. The plate 9 has preferably a series of holes 10 to receive the bolts 8 so that the plates may be fastened together in different positions thus affording an adjustment for the positions of the seat which is, of course, controlled by the fixed position of the plate 7.

It will be understood that the seat 1 may be fastened either way round to the frame and thus the rollers 3 may be either at front, as shown, or back, as in Fig. 4.

The seat-back 11 is hinged to the seat 1 as at 12 if required and the whole seat may thus be folded up as in Fig. 4.

The plate 7 has formed integrally with it an upstanding hook 13, adapted to engage the axle 3, to prevent accidental overturning of the seat when in the position of use. The hook 13 is not necessarily formed integrally with the plate 7 but may be a separate fitting attached to the floor.

The seat might cover a recess in the floor for tools, batteries or the like.

We claim:—

A vehicle seat provided with a frame, arms pivotally connected at one end to said frame and at the opposite end to the vehicle floor, said seat tiltable to a substantially vertical position about the pivotal point of the arms which is adjacent the rear end of the frame when said arms are disposed beneath the seat.

In witness whereof we have signed this specification.

ARTHUR WILLIAM CHAPMAN.
FRANK GUY LANG BIDDLECOMBE.